Dec. 29, 1942.   E. A. MEYER ET AL   2,306,460

MOLDING RETAINING CLIP

Filed Nov. 29, 1940

Inventors
Engelbert A. Meyer &
Hugh J. Bowdoin
By Blackmore, Spencer & Flint
Attorneys Patented Dec. 29, 1942

2,306,460

UNITED STATES PATENT OFFICE 2,306,460

MOLDING RETAINING CLIP

Engelbert A. Meyer and Hugh J. Bowdoin, Detroit, Mich., assignors to General Motors Corporation, Detroit, Mich., a corporation of Delaware Application November 29, 1940, Serial No. 367,696

7 Claims. (Cl. 85—5)

This invention relates to clips for holding in place the moldings used on automobile bodies.

The object of the invention is to make an improved two-part clip which is inexpensive to manufacture and which can be readily applied to an opening in an automobile body. The clip comprises a standard or molding retaining part and clip holding part. The standard or molding retaining part is used to retain the molding in place, while the clip holding part holds the clip on the body or object to which it is applied. The molding retaining part or web portion is provided with a depression at its middle part and an opening is made in the depression. The clip holding part is passed through the opening in the molding retaining part and also through the opening in the panel of the body, a flange or crown on the head of the clip holding part preventing it from passing entirely through the molding retaining part. After the clip holding part has been passed through the opening in the body, the base or head thereof is expanded against the inside of the opening to form a shoulder which prevents the clip from being withdrawn and rigidly holds it in place.

The molding retaining part is provided with the usual spring fingers over which the edge of the molding is snapped to hold it in place.

On the drawing

Figure 1:
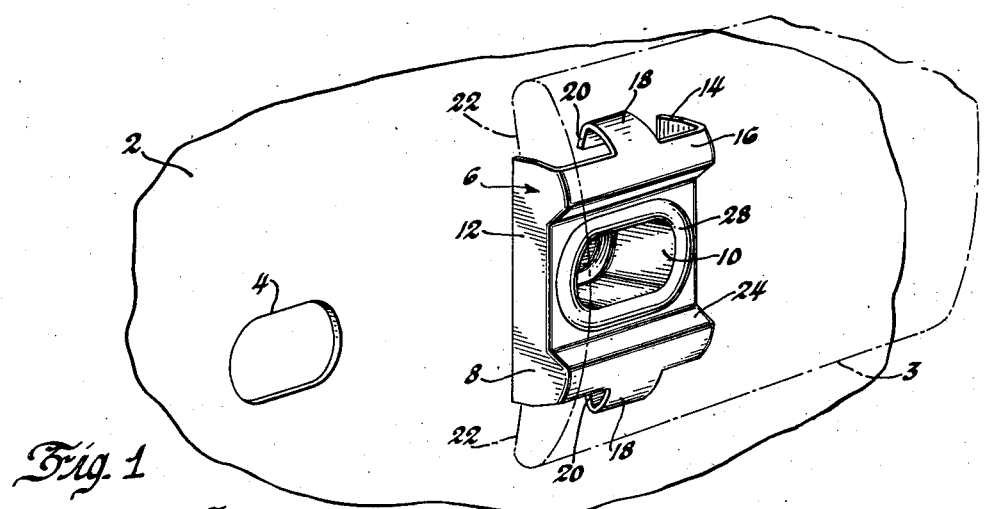
Figure 1 is a perspective view of the clip applied over an opening in an automobile body with the molding shown in dotted outline.

Referring to the drawing, the numeral 2 indicates a suitable oject, such as the body panel of an automobile, to which a channel molding 3 is to be applied. The body panel 2 has a plurality of openings 4 formed therein and over the openings the clips or standards 6 are to be applied. Each clip comprises the outer or molding retainer 8 made of spring metal and the cup-shaped metal rivet or clip holder 10 made of a softer and expandable or distortable metal. The retainer has the spaced sides or leg portions 12 and 14 and the top or web portion 16 spanning and uniting the sides. At each side of the top 16, midway between the sides 12 and 14, fingers 18 are provided. These fingers project away from the edge of the clip and have the inturned edges 20. The molding is of channel form and has the usual inturned flanges 22 which are adapted to be pressed over the fingers and snapped under the bent-in part 20. In the final position the edge of the flanges 22 will be against the edges of the sides 12 and 14 and under the bent-over part 20 of the fingers.

Figure 2:
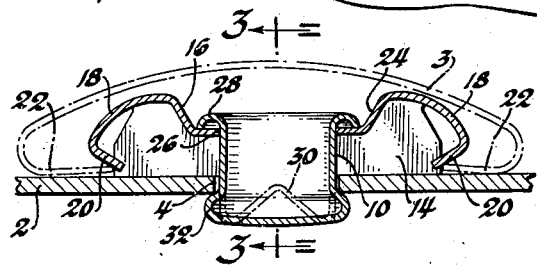
Figure 2 is a sectional view through the molding showing the head of the clip holding part in expanded position, and in dotted outline in unexpanded position.
Figure 3:
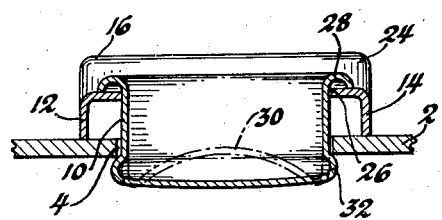
Figure 3 is a sectional view through the clip taken on the line 3—3 of Figure 2.

The head or web portion 16 has its center part depressed as indicated at 24 and is also provided with an opening 26 which may be of any suitable shape but is shown as oval in Figures 1, 2, and 3.

In the opening 26 there is received the tubular shank of the cup-shaped rivet or clip retainer 10. The clip retainer is passed through the opening from the upper side of the top 16 and is prevented from passing entirely therethrough by means of the outwardly turned flange or crown 28 on the end of part 10. The clip retainer preferably has a slight frictional fit inside the opening 26 so that it is readily retained in place although it may be easily inserted in the opening. The base portion or head of the clip retainer projects through the opening 4 in the body 2 and the position of the head immediately after part 10 has been passed through the opening is indicated by the dotted outline 30 in Figures 2 and 3. By using a suitably shaped tool and passing it through the hollow part 10 and pressing on the head 30, the head may be caused to expand to assume the position indicated by the full lines at 32, and in this position the head or shoulder 32 will be behind the edge of the opening 4 and securely retain the clip in place.

Figure 4:
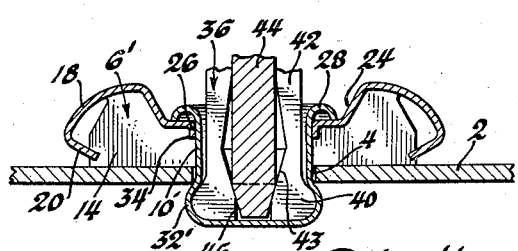
Figures 4 and 5 are sectional views corresponding to Figures 2 and 3 respectively of a slightly modified form of clip.
Figure 5:
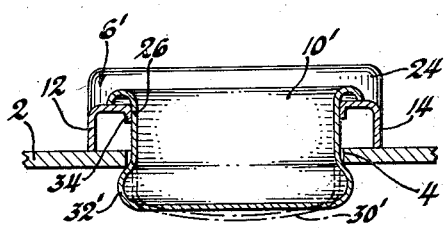
Figure 6:
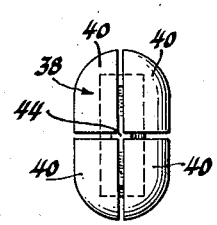
Figure 6 is an end view of the tool shown in Figure 4.

Figures 4 and 5 show a modification of the species of Figures 1, 2, and 3. The molding retainer 6' is essentially the same as the retainer 6 but differs therefrom in that a strengthening flange 34 has been provided around the opening 26. The clip holder 10' instead of having the shape shown at 30 in Figure 2, is shaped as shown in dotted outline in Figure 5. After the head of part 10' has been passed through the opening 4 a suitable tool 36 is placed inside part 10' and operated to cause the head to expand to the full line position indicated at 32'. Instead of having the inwardly pressed part 30 as shown in Figures 2 and 3, the clip of Figures 4 and 5 may have an outwardly pressed part 30' to give a small amount of excess metal to allow for expansion by the tool 36.

The tool itself has the head 38 having the four expandable parts 40, each part having a shank 42 with an inside tapered part 43 as shown in Figure 4. A plunger 44 having a beveled end 46 is adapted to be reciprocated inside the four-part head 38 to cause the head ends 40 to expand to cause the metal to be pressed by the head 38 as indicated by the position 32' in Figures 4 and 5. When the plunger 44 is withdrawn from the position shown in Figure 4, the head parts 40 will contract to enable the tool to be withdrawn from the holder 10'.

In both species of the invention the expanded head 32 or 32' of the softer metal holder 10 or 10' presses firmly and tightly against the under edge of the opening 4 to form a tight seal to prevent the entrance of water.

We claim:

1. In a molding retaining clip for application to an object provided with an opening, a molding retainer comprising sides having their edges contacting the object and interconnected by a head, said head having an opening, fingers projecting from the head and adapted to retain the molding, a separate clip holder adapted to be received in the opening, means on the clip holder to prevent it from passing entirely through the opening in the molding retainer, said clip holder adapted to extend through the opening in the object, and a head on said clip holder adapted to be expanded permanently outwardly on the other side of the opening in the object to retain the clip in place.

2. In a molding retaining clip for application to an object provided with an opening, a molding retainer comprising sides having their edges contacting the object and interconnected by a head, said head having an opening, fingers projecting from the head and adapted to retain the molding, a separate clip holder adapted to be received in the opening, a flange on the clip holder to prevent it from passing entirely through the opening in the molding retainer, said clip holder adapted to extend through the opening in the object, and a head on said clip holder adapted to be expanded permanently outwardly on the other side of the opening in the object to retain the clip in place.

3. In a molding retaining clip for application to an object provided with an opening, a molding retainer comprising sides having their edges contacting the object and interconnected by a head, said head having a depressed section with an opening therein, a separate clip holder adapted to be received in the opening, fingers projecting from the head and adapted to retain the molding, means on the clip holder to prevent it from passing entirely through the opening in the molding retainer, said clip holder adapted to extend through the opening in the object, and a head on said clip holder adapted to be expanded permanently outwardly on the other side of the opening in the object to retain the clip in place.

4. In a molding retaining clip for application to an object provided with an opening, a molding retainer comprising sides having their edges contacting the object and interconnected by a head, said head having an opening, fingers projecting from the head and adapted to retain the molding, a separate clip holder adapted to be received in the opening, means on the clip holder to prevent it from passing entirely through the opening in the molding retainer, said clip holder adapted to extend through the opening in the object, and a head on said clip holder, said head having a part thereof extending inwardly of the holder and adapted to be forced outwardly to cause the head to expand behind the opening in the object to retain the clip in place.

5. In a molding retaining clip for application to an object provided with an opening, a molding retainer comprising sides having their edges contacting the object and interconnected by a head, said head having a depressed section with an opening therein, fingers projecting from the head and adapted to retain the molding, a strengthening flange at the edge of the opening in the object, a separate clip holder adapted to be received in the opening in the object, means on the clip holder to prevent it from passing entirely through the opening in the molding retainer, said clip holding part adapted to extend through the opening in the object, and a head on said clip holder adapted to expand or to be expanded permanently on the other side of the opening in the object to retain the clip in place.

6. In a fastening device for securing a channel molding or the like to a panel: a standard of stiff sheet metal provided with means for engaging the molding, leg portions adapted to bear upon the front surface of said panel alongside an aperture provided therein and an apertured web portion spanning said leg portions and strutted thereby into spaced relation to the apertured panel surface, and means for permanently clamping said standard to said panel, said means consisting of a cup-shaped sheet metal rivet having a tubular shank extending through the apertures of said standard web, having a preformed crown bearing upon the outer surface of said web and having a deformable base portion to be transversely expanded at the rear edge of said panel aperture to draw down said standard upon said panel placing the web portion of the relatively stiff standard under sufficient deflection to insure against loosening of the bearing between the standard leg portions and said panel after completion of the assembly.

7. In a fastening device for securing a channel molding or the like to a panel: a standard of stiff sheet metal provided with means for alined engagement with the molding, leg portions adapted to bear upon the front surface of said panel adjacent opposite sides of an elongate aperture provided therein and a correspondingly apertured web portion spanning said leg portions and strutted thereby into spaced relation to the apertured panel surface, and means for permanently clamping said standard to said panel, said means consisting of a cup-shaped sheet metal rivet having an oblong tubular shank extending through the aperture of said standard web, having a preformed crown bearing upon the outer surface of said web and having a deformable base portion to be transversely expanded at the rear edge of said panel aperture to draw down said standard upon said panel placing the web portion of the relatively stiff standard under sufficient deflection to insure against loosening of the bearing between the standard leg portions and said panel after completion of the assembly.

ENGELBERT A. MEYER.
HUGH J. BOWDOIN.